United States Patent [19]

Wanat et al.

[11] Patent Number: 5,063,259

[45] Date of Patent: Nov. 5, 1991

[54] CLEAR, IMPACT-RESISTANT PLASTICS

[75] Inventors: Robert A. Wanat, Langhorne, Pa.; Charles C. Crabb, Mt. Laurel, N.J.

[73] Assignee: Rohm and Haas Company, Philadelphia, Pa.

[21] Appl. No.: 547,743

[22] Filed: Jul. 3, 1990

[51] Int. Cl.$^5$ .......................... C08G 83/00; C08F 6/14
[52] U.S. Cl. ...................................... 523/201; 525/85; 528/487
[58] Field of Search .................... 523/201; 525/80, 85; 528/487

[56] References Cited

U.S. PATENT DOCUMENTS 3,793,402 2/1974 Owens .
3,808,180 4/1974 Owens .
4,602,083 7/1986 Hung .

*Primary Examiner*—Paul R. Michl
*Assistant Examiner*—Peter Szekely
*Attorney, Agent, or Firm*—Roger K. Graham

[57] ABSTRACT

Plastics prepared from blends of polymers of methyl methacrylate with heterogeneous core/shell polymers having an poly(alkyl acrylate) core and a poly(alkyl methacrylate)shell exhibit improved color when the heterogeneous core/shell polymer is treated with a reducing agent.

25 Claims, No Drawings

CLEAR, IMPACT-RESISTANT PLASTICS

FIELD OF THE INVENTION

This invention relates to clear, impact-resistant thermoplastic based on a poly(methyl methacrylate) matrix and a process for improvement of their color.

BACKGROUND OF THE INVENTION

Poly(methyl methacrylate) has been known for many years as an useful material for a clear, weatherable thermoplastic. It can be prepared or formed into sheet or molded articles, it has excellent resistance to weathering, it has a high service temperature, preventing distortion on exposure to warm environments, it does not embrittle significantly on cooling, it has adequate toughness or impact resistance for many uses, surpassing glass in that respect, and it has excellent optical properties in its combination of light transmittance and avoidance of color. Such optical values are measured as % total white light transmittance, yellowness index, and haze.

Its major deficiency, as compared to materials like polycarbonate, has been lack of impact resistance. Many studies have been made to improve the impact resistance while maintaining the other desirable physical properties, including clarity. Most of these centered on the use of weatherable elastomeric materials, such as copolymers of alkyl acrylates, disperse in the poly(methyl methacrylate) matrix. The most commercially successful of these has been the use of a core/shell modifier structure, utilizing a butyl acrylate/styrene copolymer which has a refractive index matched to the poly(methyl methacrylate) matrix, and a grafted poly(methyl methacrylate) shell, the particle size being below 0.5 microns and the isolated particle dispersed in the poly(methyl methacrylate) matrix. A further improvement in the impact modifier has been the presence of a "hard core" of methyl methacrylate, chemically attached to the intermediate rubbery layer. The resulting polymer offers good optical properties, good resistance to crease-whitening on impact, and a five- to ten-fold increase in toughness over the unmodified matrix polymer.

The technology for such "core-shell" impact modifiers is described in Owens, U.S. Pat. No. 3,793,402, herein incorporated by reference. The technology for other core-shell modifiers is described in Owens, U.S. Pat. No. 3,808,130, also herein incorporated by reference. Many variants in the nature of such polymers may be utilized, including the order in which the various layers are created, the nature and extent of the grafting and/or crosslinking processes, the types of crosslinking monomers (defined in Owens as a monomer having two or more unsaturated sites of equal reactivity such as butylene glycol dimethacrylate, ethylene glycol diacrylate, and the like) and graftlinking monomers (a monomer having two or more sites of unequal reactivity, such as allyl methacrylate, diallyl maleate, and the like), the particle size, and the means of isolation. Also variations in the number and order of stages have been taught in several patent applications. It is anticipated that the present invention will be useful for all such variants.

The most convenient way to prepare such modifiers has been by sequential emulsion polymerization, as described in Owens, wherein the first stage or core of the multi-stage heterogeneous polymer is formed in emulsion, a second monomer or mixture of monomers is added under conditions which produce no new particles, so that the second monomer is polymerized on the surface or within the first polymer particle, the process being repeated until all the stages have been polymerized, the stages being attached to and intimately associated with the preceding stage. The additive is then usually isolated by spray-drying or coagulation and then blended with the poly(methyl methacrylate) matrix.

Because the matrix polymer is usually prepared by a bulk process in which few if any contaminants are present, whereas the emulsion process requires emulsifier, buffer salts, initiators which may be inorganic salts, and the like, the possibility exists that the isolation process, especially if it is spray-drying or coagulation under conditions where the emulsifier is not readily removed, will result in contaminants present in the impact modifier component which will affect the color or optical properties. Such contaminants may be insoluble precipitates which scatter light and cause haze, or they may be soluble components which contribute to color or which are sensitive to processing to form color.

A long-known and effective means for counteracting yellow color within a polymer sample has been to add very low levels of blue pigments or dyes, called toners. However, addition of toner will lower the amount of total white light transmittance, and, unless carefully controlled, will produce green or blue color.

Hung, U.S. Pat. No. 4,602,083, incorporated by reference, teaches that a variety of acrylic-based emulsions, including the impact modifier and the matrix polymer described herein, may be isolated from emulsion by the use of alkaline earth hypophosphites as coagulating agents, and that the resulting polymers have an improved combination of water resistance and optical properties, such as color, than similar materials isolated with conventional coagulants. Hung's process utilizes far larger quantities of the hypophosphite than are taught here, may also use other non-nucleophilic anions which are not reductants, and is not applicable to isolation of the impact modifier component by spray-drying. Hung does not suggest the utility in color reduction of the substantially lower amounts of reductant used in the present invention.

A means to lower the levels of both insoluble haze-producing and soluble color-producing contaminants has long been sought, and it is discovery of an method for improving the color without contributing to haze that is the present invention.

SUMMARY OF THE INVENTION

Thus, this invention relates to process for the improvement in color of poly(methyl methacrylate) modified to improve impact resistance with a core/shell polymer based on an poly(alkyl acrylate) copolymer rubbery stage and a poly(alkyl methacrylate) outer stage, when the core/shell polymer prepared by an emulsion process is treated with a small amount of a phosphorus-containing reducing agent, preferably sodium hypophosphite, prior to isolation from the emulsion and subsequent blending with the matrix poly(methyl methacrylate) in molten form. In one variant of the invention, the so-treated emulsion may be concurrently or sequentially co-isolated with the matrix polymer which has been separately prepared in emulsion form, the co-isolation being by spray-drying, kettle coagulation, or coagulation within an extruder. In another variant of the process, the core/shell polymer may be treated in emulsion by the reducing agent, isolated from the emulsion in solid form, and subsequently blended with the matrix poly(methyl methacrylate) while the latter is also in solid non-molten form, followed by melt-processing of the modifier/matrix blend. In another variant, the core/shell polymer is isolated from emulsion, the solid polymer then treated with the reducing agent, and thus-treated polymer then blended with the matrix poly(methyl methacrylate) in solid or molten form.

DETAILED DESCRIPTION

The matrix polymer may be a homopolymer of methyl methacrylate or a copolymer of up to about 30 weight percent of a monomer copolymerizable with methyl methacrylate, such as other methacrylates, styrene, alpha-methyl styrene, acrylate esters, and the like. Of such co-monomers, preferred are the lower alkyl esters of acrylic acid, such as methyl acrylate, ethyl acrylate, butyl acrylate and the like, which enhance thermal stability and maintain the weather resistance of the matrix. Especially preferred are copolymers from about 0.5 to about 5 weight percent of methyl or ethyl acrylate.

The molecular weight of the matrix polymer may be varied depending on whether the resulting polymer is to be extruded into sheet or capstock or is to be injection-molded into useful objects. A molecular weight (weight average) above about 80,000 is desired to maintain physical properties, such as toughness and heat distortion temperature, while values of above about 200,000 are too high in melt viscosity to be readily fabricated into useful objects.

The matrix polymer may be prepared by many methods, such as in emulsion, by suspension process, by solution process, or by bulk polymerization. Continuous processes may be used. If an emulsion process is used, the treatment with a reducing agent disclosed herein may also be employed. Preferred is a continuous bulk process, in which a mixture of monomers with organic peroxide initiators and mercaptan chain-transfer agents are pumped to a continuous flow, stirred tank reactor, the polymerization conducted to about 50% conversion, the polymer-monomer mixture pumped to a devolatilizing extruder, preferably a twin-screw extruder, where residual monomer is removed and other additives, including the impact modifier, may be added.

The preferred type of modifier resin for use in the practice of the present invention is described in the aforementioned U.S. Patents to Owens. The impact modifier resin comprises multi-layered polymeric particles. Speaking generally such resins are prepared by emulsion polymerizing a mixture of monomers in the presence of a previously formed polymeric product. More specifically, such resins are prepared from monomers in aqueous dispersion or emulsion and in which successive monomeric charges are polymerized onto or in the presence of a preformed latex prepared by the polymerization of a prior monomer charge and stage. The polymeric product of each stage can comprise a homopolymer or a copolymer. In this type of polymerization, the polymer of the succeeding stage is attached to and intimately associated with the polymer of the preceding stage.

In such core/shell structures for the present use, required is at least one rubbery stage which is predominantly derived from units of a lower alkyl acrylate, preferably butyl acrylate, copolymerized with a sufficient amount of at least one other monomer which will raise the refractive index of the rubbery stage to match that of the matrix resin, such as phenyl acrylate, butadiene, vinyl benzoate, and the like. Useful for this purpose, and detracting little from the weatherability and impact of the impact modifier, are monomers designated vinyl aromatics, such as styrene, alpha-methylstyrene, para-methylstyrene, vinyl toluene, monochlorostyrene, and the like. Styrene is preferred. The amount of styrene will vary depending on the exact composition of the matrix polymer, but is generally from about 15 to about 20 weight percent of the rubbery stage.

The amount of outer stage may vary, depending on how the impact modifier is to be isolated. To spray-dry, sufficient outer stage is required to allow the resultant product to flow freely. The composition of the outer stage is preferably very similar to that of the matrix polymer, that is, a polymer predominantly comprised of units derived from methyl methacrylate, but optionally with small amounts of a copolymerized alkyl acrylate.

Multi-stage structures may be utilized in the core/shell polymer, as longer as the outer stage and at least one rubbery stage are present, so that three-, four- and multi-stage structures may be formed.

Preferred, as taught in Owens '402, is a multi-layered polymeric particle comprising three sequential stages of a non-rubbery non-shell stage, first stage polymer, an elastomeric second stage polymer and a relatively hard third stage polymer, with the monomers (co-monomers) used in preparing each stage of the resin being selected, as described in the '402 patent, to provide stages or layers that have the aforementioned non-elastomeric, elastomeric, and hard properties.

As taught in the Owens patents, it is preferred that at least one of the rubbery or non-shell non-rubbery stage contains units derived from at least one monomer having more than one copolymerizable double bond.

As discussed in the '402 patent, the non-elastomeric polymer or "hard core" polymer formed in the first stage of polymerization has a glass transition temperature of greater than 25° C., and it is linked to an elastomeric polymer prepared in a subsequent stage from monomeric constituents such that the glass transition temperature thereof is 25° C. or less, preferably less than 10° C., and such elastomeric polymer is in turn linked to a polymer prepared in a subsequent stage from monomers such that the glass transition temperature of the polymer is preferably greater than 25° C., and most preferably at least about 60° C.

Preferred particles are those in which the core layer and the outer layer thereof comprise resins which are made from the same monomer(s) that are used to prepare the matrix resin of the composition, that is, homopolymers of methyl methacrylate or random copolymers of methyl methacrylate (about 88 to about 99.9 wt. %) and a C1 to C4 alkyl acrylate (about 0.1 to about 5 wt. %), most preferably ethyl acrylate, a graft-linking monomer, such as allyl methacrylate, diallyl maleate, and the like, and optionally, a polyfunctional cross-linking monomer, such as ethylene glycol dimethacrylate, butylene glycol diacrylate, and the like. When the matrix resin comprises a copolymer of methyl methacrylate and ethyl acrylate, it is highly preferred that the core and the outer layers of the particles comprise about 96 to about 99 wt. % of methyl methacrylate and about 1 to about 4 wt. % of ethyl acrylate, with the graft-linking monomer comprising about 1 wt. %. In accordance with the teachings of the '402 patent, various types of monomers can be used to prepare the intermediate layer of the particles. An exemplary intermediate layer comprises a random copolymer of butyl acrylate, styrene, and less than about 2 wt. % of the cross-linking and graft-linking monomers.

The impact modifier component is most effectively prepared in emulsion. A variety of surfactants may be used, such as cationic, anionic, and non-ionic. Preferred are anionic surfactants for rapid rates, use of relatively low levels to create stable latices without new particle formation, and little effect on color or haze. Preferred are sulfonic acid salts, usually the sodium salts of alkanes or alkaryl compounds, or ethoxylated alkaryl compounds, such as sodium dodecyl sulfonate, sodium dioctylsulfosuccinate, sodium dodecylbenzene sulfonate, and the like.

Initiation may be conducted by use of conventional initiators for emulsion polymerization, such as peroxides, hydroperoxides, persulfates, and the like, and such may be used in conjunction with common components of redox pairs, such as sodium formaldehyde sulfoxylate, sodium hydrosulfite, and the like. The presence of absence of such sulfur-containing reducing agents in the initiation system does not appear to create or correct the color problem which is overcome by the post-addition of reductant materials.

The ratios of useful stages are fully discussed in the Owens patents. It is preferred that the outer stage of the core/shell polymer be no more than about 25% of the total core/shell polymer for obtaining the highest impact efficiency. However, if all the product is to be isolated by a coagulative process from emulsion, it is acceptable to polymerize most or all of the matrix polymer in the presence of the elastomeric phase or phases.

The impact modifier may be blended with other emulsions for use in modifying the viscosity of the molten blend with the matrix polymer, or in aiding the isolation of the relatively soft impact modifier during spray-drying or coagulation. Useful for the former purpose are random copolymers comprised predominantly of units derived from methyl methacrylate with from about 0.1 to about 10% of a copolymerized alkyl acrylate, such as ethyl acrylate, the molecular weight being from about 80,000 to about 150,000. Useful for the latter purpose are high molecular weight polymers or copolymers comprised predominantly of units derived from methyl methacrylate and having a molecular weight of at least 1,000,000.

Such optional resins can comprise from about 1 to about 20 weight percentof the polymer blend to be isolated.

The post-treatment of the emulsion or blend of emulsions is conducted by contacting the emulsion at a temperature from just above the freezing point to just below the boiling point, but preferably between room temperature and 80° C., with a small amount of an aqueous solution or dispersion of a phosphorus-containing reductant, so that the concentration of the reductant is from about 0.005 to about 0.10 parts per 100 parts of emulsion.

The reductants of the present invention are organic or inorganic compounds which lower the color of the isolated polymer after treatment and do not contribute themselves to color or haze of the resultant product. Preferred as reductants are phosphorous-containing compounds wherein the valence of the phosphorus atom is +3 or +1. The major classes thus included are phosphites (+3) and hypophosphites (+1), but other compounds, such as phosphonites and phosphinites may also be utilized. The components may be organic, such as tris(nonylphenyl phosphite) or may be inorganic, such as hypophosphite salts. For ease of addition, water-soluble materials are preferred. To prevent precipitation of insoluble salts, it is preferred to use salts of the alkali metals or ammonium salts. Especially preferred is sodium hypophosphite.

The impact modifier, singly or combined with the optional resins, may further be blended with emulsion of the matrix polymer for co-isolation, such as by spray-drying, freeze-drying, and the like, and especially by coagulation, such as with salts, acids, methanol, and the like.

Co-isolation in an extruder, wherein the water from the emulsion and coagulative additives is removed as a liquid, as described in Hung, may also be practiced with the emulsion or emulsions treated wit the reductant chemical or chemicals. However, the results obtained, although generally showing some improvement in the optical properties, are inconsistent with the level of reductant used. It may be that color and other optical properties in the extruder-coagulated samples is dominated by other factors which the emulsion post-treatment does not fully address.

The co-blending may also be utilized in aiding the isolation of the relatively soft, rubber-rich additive by spray-drying. Sequential co-blending, such as described in Grandzol et al., U.S. Pat. No. 4,463,131, may be used in coagulation to isolate the impact modifier in a more free-flowing form.

If the impact modifier or impact modifier blend, having been treated with the reductant, is to be isolated and blended with the matrix polymer in the solid state, the matrix being in pelletized form, a powder/pellet dryblend may be fed to a single screw extruder (25 mm diameter; 600 mm screw effective length) in which the dryblend is melted and dispersively mixed. Barrel temperatures from the feed zone to the die zone are in the range 204° C./227° C./243° C.; the die temperature is controlled at about 232° C. The melt is extruded as a strand, cooled in water, and then cut into pellets. An alternative method is to pass the dryblend through a co-rotating intermeshing twin-screw extruder (30 mm diameter; 720 mm effective length of screws), rather than a single screw extruder.

The matrix polymer may be from about 40 to about 90 weight percent of the impact-modified acrylic plastic, and the core/shell polymer or blend containing core/shell polymer from about 10 to about 60 parts. The higher the amount of core/shell polymer, the tougher the impact-modified plastic, but the heat distortion temperature and tensile modulus will be decreased. Preferably the matrix resin will be from about 50 to about 70 parts of the impact-modified plastic.

Optional ingredients may be present in the impact-modified acrylic plastic generally added to the molten matrix polymer. Such ingredients may include toners, dye, pigment, lubricants, ultraviolet stabilizers, thermal stabilizers, and the like.

The impact-modified acrylic plastic may be isolated from the molten stage either by direct processing into a film, sheet, or molded object. Usually, the molten impact-modified acrylic plastic is extruded from the molten stage through a die, stands are formed, cooled, and chopped into pellets, which are subsequently remolded or re-extruded into useful objects.

The resulting impact-modified acrylic plastic may be formed into transparent films useful as overlays, protective coatings for other plastics, capstock, and the like. Thicker sheets may be extruded useful as glazing, picture framing, sun roofs, sky lights, automotive glazing, storm windows, toy parts, vending machine windows, lighting lenses and many other uses requiring high clarity, lack of yellowness, and toughness. The sheets may be treated with appropriate abrasion-resistant coatings, well-known to the art.

The pellets may also be injection- or compression-molded by techniques well-known to the art into useful objects, such as containers, boxes, decorative objects, window scrapers, and the like.

EXAMPLES

The examples are intended to illustrate the present invention and not to limit it except as it is limited by the claims. All percentages are by weight unless otherwise specified, and all reagents are of good commercial quality unless otherwise specified.

Polymers for the following study were generally prepared in emulsion, except where a component was prepared by continuous bulk polymerization, and isolated by various methods described in the specific examples.

Injection molding was conducted on extruded samples. Extrusion was carried out in a 25.4 mm. single-screw extruder with a barrel setting at 227° C., then pelletized. Injection molding was conducted on a Newbury machine with a cycle of 45 seconds. Plaques 50.8 by 76.2 by 3.2 mm. were prepared. Barrel temperatures of ca. 218° C. and mold temperatures of 65° to 82° C. may be employed.

Yellowness index (ASTM D 1925 ), haze (D 1003) and TWLT (D 1746) were measured by well-known methods.

EXAMPLES 1-4

The following examples illustrate the preparation of matrix polymers and of core//shell impact modifiers Matrix Polymer A: A commercial copolymer of methyl methacrylate (MMA) 95.5/ ethyl acrylate (EA) 4.5, weight-average molecular weight ca. 110,000, prepared by continuous bulk polymerization. Contains no toner. (Example 1).

Matrix Polymer B: A copolymer of MMA/EA 96/4, MV 110,000, prepared with sodium persulfate initiator, n-dodecyl mercaptan chain transfer agent, t-dodecyl disulfide as stabilizer, and sodium dodecylbenzene sulfonate as emulsifier. (Example 2).

Impact Modifier Blend C: A three-stage polymer of stage ratio (by weight) MMA/EA/allyl methacrylate (ALMA)=33.5/1.4/0.07//butyl acrylate (BA)/styrene (St)/ALMA=36.3/7.9/0.9// MMA/EA 19.2/0.8, made by the method of Owens, initiated with potassium persulfate and stabilized with potassium dodecylbenzene sulfonate. (Example 3).

Impact Modifier Blend D: The emulsifier of impact modifier C (84 parts on a solids basis) is blended with 10 parts of the emulsion of matrix polymer B and 6 parts of a high molecular weight methyl methacrylate/ethyl acrylate polymer prepared with sodium lauryl sulfate as emulsifier and sodium persulfate as initiator (Example 4).

EXPERIMENT 5

This experiment demonstrates the effect of phosphorus-based reductants on the impact modifier of Example 3. To the portions of the emulsion were added various levels of potential reductants. Samples were added as a 1% aqueous solution, with 0.5% sodium dodecylbenzene sulfonated added to disperse the organic additives. The sample was then dried in air at 110° C., then exposed to a 220° C. oven in air for 20 minutes, and the samples visually checked for appearance. Siponate DS-4, sodium dodecylbenzenesulfonate emulsifier at levels up to 0.2% additional had little or no effect on color. Sodium sulfite, a known reductant, but not based on phosphorus, showed some color reduction at the 0.2% level, but was ineffective at lower levels. Naugard PHR, tri(nonylphenylphosphite), showed some color reduction at the 0.05,0.1, and 0.2% levels. Hypophosphorus acid showed strong color reduction at all three levels, as did sodium hypophosphorus.

EXAMPLE 6

This example demonstrates the effect of the phosphorus-based reductant on the color of molded pieces. Here equal weights (solids basis) of the latex of Examples 2 and 4 were blended, the reductant added, the mixture freeze-dried, the impact-modified acrylic blend extruded, pelletized and injection molded into plaques. The level of reductant is calculated on a solids/solids basis. In the tables, NaH2PO2 is sodium hypophosphite, TNPP is tris(nonylphenyl phosphite), YI is yellowness index and TWLT is total white light on 3.18 mm. plaques. In this test, TNPP was less effective than sodium hypophosphite.

| Additive | level, % | YI | % haze | % TWLT |
| --- | --- | --- | --- | --- |
| none (control) | — | 5.2 | 2.4 | 91.2 |
| NaH2PO2 | 0.025 | 3.7 | 2.3 | 91.7 |
| | 0.05 | 3.6 | 2.4 | 91.7 |
| | 0.10 | 3.1 | 2.9 | 91.0 |
| TNPP | 0.05 | 5.9 | 2.4 | 90.3 |
| | 0.10 | 5.8 | 2.5 | 90.6 |

EXAMPLE 7

To demonstrate the effect of the reductant on treatment of the impact modifier which is then blended with a bulk-prepared matrix polymer, the latex blend of Example 4 was treated with the reductant prior to spray-drying at an inlet/outlet temperature of 150° C./50° C. The spray-dried powder was blended with an equal weight of the pellets of the polymer of Example 1, extruded into pellets, and the pellets compression molded as in Example 9.

| Additive | level, % | YI | YI-2 |
| --- | --- | --- | --- |
| none (control) | — | 4.44 | 4.58 |
| NaH2PO2 | 0.025 | 1.97 | 1.83 |
| | 0.05 | 1.94 | 1.89 |
| | 0.10 | 2.02 | 2.00 |
| TNPP | 0.05 | 3.05 | 2.04 |
| | 0.10 | 2.94 | 2.98 |

EXAMPLE 8

This example demonstrates the effect of lower levels of the reductant on the injection molded impact-modified acrylic plastic. The emulsion of Example 4 was treated with various reductants, freeze-dried, blended with an equal amount of the polymer of Example 1, extruded into pellets, and injection molded into 3.18 mm. plaques which are measured by Hunter colorimeter. Here $Ca(H_2PO_2)_2$ hypophosphite and $H_3PO_2$ hypophosphorus acid.

| Additive | level, % | YI | % haze | % TWLT |
|---|---|---|---|---|
| none (control) | — | 3.60 | 2.14 | 91.6 |
| $NaH_2PO_2$ | 0.005 | 2.51 | 2.54 | 91.9 |
|  | 0.015 | 1.69 | 1.96 | 92.5 |
|  | 0.025 | 2.00 | 2.96 | 91.7 |
| $Ca(H_2PO_2)_2$ | 0.025 | 1.54 | 2.01 | 92.7 |
| $H_3PO_2$ | 0.025 | 2.10 | 2.00 | 92.5 |

EXAMPLE 9-10

This example illustrates that sodium hypophosphite can be added to the isolated impact modifier to reduce color when the impact modifier is then blended with the matrix resin and processed.

The impact modifier of Example 4, in the form of a spray-dried powder, was blended with an equal weight of a commercial methyl methacrylate/ethyl acrylate copolymer containing no toner and various levels of sodium hypophosphite; the amounts are in parts per million of the total polymer weight. The blends were then extruded in a single screw extruder at 232° C. and 80 rpm through a pelletizing dye, the resulting strand cooled, and pellets preparing by chopping the strand. After drying the pellets were compression molded into plaques at 226° C. under pressure in a Carver press. The plaques were 3.2 mm. thick, and optical properties were measured as above.

| Example | Sodium hypophosphite, ppm | Yellowness Index |
|---|---|---|
| 9a | 0 (control) | 2.57 |
| 9b | 50 | 2.05 |
| 9c | 100 | 1.92 |
| 9d | 200 | 1.80 |

In a similar manner, sodium hypophosphite was dry-blended with a commercial acrylic molding resin of similar molecular weight but containing only about 0.5% ethyl acrylate and with an impact modifier which contained no high molecular weight acrylic polymer. The weight ratio of matrix to modifier was 1:1. A similar improvement in color was observed.

| Example | Sodium hypophosphite, ppm | Yellowness Index |
|---|---|---|
| 10a | 0 (control) | 1.86 |
| 10b | 50 | 1.64 |
| 10c | 100 | 1.44 |
| 10d | 200 | 1.41 |

While the invention has been described with reference to specific examples and applications, other modifications and uses for the invention will be apparent to those skilled in the art without departing from the spirit and scope of the invention defined in the appended claims.

We claim:

1. A process for preparing a clear, impact-modified acrylic plastic with improved color which comprises:
  (a) preparing in emulsion a heterogeneous core/shell polymer of at least one rubbery stage containing a preponderance of units derived from at least one alkyl acrylate and an outer stage containing a preponderance of units derived from methyl methacrylate;
  (b) optionally adding at least one emulsion polymer which is preponderantly comprised of units derived from methyl methacrylate to form a polymer blend in emulsion form;
  (c) subsequently adding from about 0.005 to about 0.025 parts of an phosphorus-containing inorganic reducing agent per 100 parts of emulsion, wherein the phosphorus-containing inorganic reducing agent is a water-soluble alkaline earth salt of a phosphorus-containing inorganic acid wherein the phosphorus is in a valence state of +3 or +1 or a phosphorus-containing inorganic acid wherein the phosphorus is in a valence state of +3 or +1;
  d) isolating the core/shell polymer or the polymer blend from the emulsion;
  e) concurrently or subsequently blending the isolated polymer with a matrix polymer predominantly derived from units of methyl methacrylate to form the impact-modified acrylic plastic in molten form;
  f) optionally adding other additives to the impact-modified acrylic polymer in molten form;
  g) isolating the impact-modified acrylic plastic in solid form by extruding and cooling.

2. A process for preparing a clear, impact-modified acrylic plastic with improved color which comprises:
  a) preparing in emulsion a heterogeneous core/shell polymer of at least one rubbery stage containing a preponderance of units derived from at least one alkyl acrylate and an outer stage containing a preponderance of units derived from methyl methacrylate;
  b) optionally adding at least one emulsion polymer which is preponderantly comprised of units derived from methyl methacrylate to form a polymer blend in emulsion form;
  c) subsequently adding from about 0.005 to 0.10 parts of an alkali metal or ammonium salt of a phosphorus-containing inorganic acid wherein the phosphorus is in a valence state of +3 or +1 per 100 parts of emulsion;
  d) isolating the core/shell polymer or the polymer blend from the emulsion;
  e) concurrently or subsequently blending the isolated polymer with a matrix polymer predominantly derived from units of methyl methacrylate to form the impact-modified acrylic plastic in molten form;
  f) optionally adding other additives to the impact-modified acrylic polymer in molten form;
  g) isolating the impact-modified acrylic plastic in solid form by extruding and cooling.

3. A process for preparing a clear, impact-modified acrylic plastic with improved color which comprises:
  a) preparing in emulsion a heterogeneous core/shell polymer of at least one rubbery stage containing a preponderance of units derived from at least one alkyl acrylate and an outer stage containing a preponderance of units derived from methyl methacrylate;
  b) optionally adding at least one emulsion polymer which is preponderantly comprised of units derived from methyl methacrylate to form a polymer blend in emulsion form;

c) isolating the core/shell polymer or the polymer blend from the emulsion;

d) adding from about 0.005 to 0.10 parts of an alkali metal or ammonium salt of a phosphorus-containing inorganic acid wherein the phosphorus is in a valence state of +3 or +1 per 100 parts of isolated core/shell polymer or polymer blend to produce an admixed impact modifier;

e) blending the admixed impact modifier with a matrix polymer predominantly derived from units of methyl methacrylate to form the impact-modified acrylic plastic in molten form;

f) optionally adding other additives to the impact-modified acrylic polymer in molten form;

g) isolating the impact-modified acrylic plastic in solid form by extruding and cooling.

4. The process of claims 1 or 2 wherein the heterogeneous core/shell polymer contains at least one additional non-rubbery non-shell stage containing a preponderance of units derived from methyl methacrylate.

5. The process of claim 2 wherein the alkali metal salt of the phosphorus-containing inorganic acid is sodium hypophosphite.

6. The process of claims 1 or 2 wherein the outer stage of the core/shell polymer is no more than about 25 weight percent of the total core/shell polymer.

7. The process of claim 4 wherein at least one of the rubbery stage or the non-rubbery non-shell stage contains units derived from at least one monomer having more than one copolymerizable double bond.

8. The process of claims 1 or 2 wherein the core/shell polymer or polymer blend is isolated by spray-drying.

9. The process of claims 1 or 2 wherein the core/shell polymer or polymer blend is isolated by coagulation.

10. The process of claim 8 wherein the matrix polymer is prepared continuously by a bulk process.

11. The process of claim 3 wherein the heterogeneous core/shell polymer contains at least one additional non-rubbery non-shell stage containing a preponderance of units derived from methyl methacrylate.

12. The process of claim 11 wherein the phosphorus-containing reducing agent is a compound wherein the phosphorus is in a valence state of +3 or +1.

13. The process of claim 3 wherein the alkali metal salt of the phosphorus-containing inorganic acid is sodium hypophosphite.

14. The process of claim 3 wherein the outer stage of the core/shell polymer is no more than about 25 weight percent of the total core/shell polymer.

15. The process of claim 11 wherein at least one of the rubbery stage or the non-rubbery non-shell stage contains units derived from at least one monomer having more than one copolymerizable double bond.

16. The process of claim 3 wherein the core/shell polymer or polymer blend is isolated by spray-drying.

17. The process of claim 3 wherein the core/shell polymer or polymer blend is isolated by coagulation.

18. The process of claim 16 wherein the matrix polymer is prepared continuously by a bulk process.

19. The plastic prepared by the process of claim 1, 2 or 3.

20. Articles prepared from the plastic of claim 19.

21. The article of claim 20 which is transparent film.

22. The article of claim 20 which is transparent sheet.

23. The article of claim 20 which has been molded.

24. The process of claim 17 wherein the matrix polymer is prepared continuously by a bulk process.

25. The process of claim 1 wherein the phosphorus-containing inorganic reducing agent is calcium hypophosphite or hypophosphorous acid.

* * * * *